United States Patent
Ciccarelli et al.

(10) Patent No.: US 8,781,426 B2
(45) Date of Patent: Jul. 15, 2014

(54) TECHNIQUES FOR CONTROLLING OPERATION OF CONTROL LOOPS IN A RECEIVER

(75) Inventors: Steven C. Ciccarelli, Ramona, CA (US); Brian Banister, San Diego, CA (US); Brian George, San Diego, CA (US); Soon-Seng Lau, San Diego, CA (US); Prasad Gudem, San Diego, CA (US); Arun Raghupathy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1027 days.

(21) Appl. No.: 11/560,802

(22) Filed: Nov. 16, 2006

(65) Prior Publication Data

US 2008/0039042 A1 Feb. 14, 2008

Related U.S. Application Data

(60) Provisional application No. 60/800,484, filed on May 15, 2006, provisional application No. 60/865,548, filed on Nov. 13, 2006.

(51) Int. Cl.
*H04B 1/06* (2006.01)
(52) U.S. Cl.
USPC ............ 455/234.1; 455/240.1; 455/280; 455/343.2
(58) Field of Classification Search
USPC .......................................... 455/234.1
See application file for complete search history.

(56) References Cited

U.S. PATENT DOCUMENTS

| | | | |
|---|---|---|---|
| 5,361,072 A | 11/1994 | Barrick et al. | |
| 5,722,061 A | 2/1998 | Hutchison et al. | |
| 6,134,430 A | 10/2000 | Younis et al. | |
| 6,175,279 B1 * | 1/2001 | Ciccarelli et al. | 330/296 |
| 6,498,926 B1 | 12/2002 | Ciccarelli et al. | |
| 6,980,786 B1 | 12/2005 | Groe | |

(Continued)

FOREIGN PATENT DOCUMENTS

| | | |
|---|---|---|
| CN | 1520637 A | 8/2004 |
| JP | 3285424 A | 12/1991 |

(Continued)

OTHER PUBLICATIONS

International Search Report—PCT/US07/068724—International Search Authority—European Patent Office—Oct. 24, 2007.

(Continued)

*Primary Examiner* — Ajibola Akinyemi
(74) *Attorney, Agent, or Firm* — Ramin Mobarhan

(57) ABSTRACT

Techniques for controlling operation of control loops in a receiver are described. The operation of at least one control loop is modified in conjunction with a change in operating state, which may correspond to a change in linearity state, gain state, operating frequency, antenna configuration, etc. A change in linearity state may occur when jammers are detected and may cause bias current of analog circuit blocks to be adjusted. The at least one control loop to be modified may include a DC loop, an AGC loop, etc. The operation of a control loop may be modified by disabling the control loop or changing its time constant prior to changing operating state, waiting a predetermined amount of time to allow the receiver to settle, and enabling the control loop or restoring its time constant after waiting the predetermined amount of time.

28 Claims, 8 Drawing Sheets

(56) References Cited

U.S. PATENT DOCUMENTS

| | | | |
|---|---|---|---|
| 7,010,330 B1 | 3/2006 | Tsividis | |
| 7,130,602 B2 | 10/2006 | Ciccarelli | |
| 2002/0042256 A1* | 4/2002 | Baldwin et al. | 455/232.1 |
| 2002/0132597 A1 | 9/2002 | Peterzell et al. | |
| 2005/0134336 A1* | 6/2005 | Goldblatt et al. | 327/156 |
| 2005/0221790 A1* | 10/2005 | Persico et al. | 455/343.2 |
| 2007/0072572 A1* | 3/2007 | Lee | 455/280 |

FOREIGN PATENT DOCUMENTS

| | | |
|---|---|---|
| JP | 07321767 | 12/1995 |
| JP | 10290173 A | 10/1998 |
| JP | 11298348 A | 10/1999 |
| KR | 20020094610 | 12/2002 |
| WO | WO2005099109 A1 | 10/2005 |

OTHER PUBLICATIONS

Written Opinion—PCT/US07/068724, International Search Authority, European Patent Office, Oct. 24, 2007.

European Search Report—EP09175722—Search Authority—Munich—Jan. 7, 2010.

* cited by examiner

TECHNIQUES FOR CONTROLLING OPERATION OF CONTROL LOOPS IN A RECEIVER

The present application claims priority to provisional U.S. Application Ser. No. 60/800,484, entitled "State Machine for Control of Intelliceiver," filed May 15, 2006, and to provisional U.S. Application Ser. No. 60/865,548, entitled "Techniques for Controlling Operation of Control Loops in a Receiver," filed Nov. 13, 2006, both of which are assigned to the assignee hereof and incorporated herein by reference.

BACKGROUND

I. Field

The present disclosure relates generally to communication, and more specifically to techniques for controlling the operation of a receiver in a communication system.

II. Background

The design of a high performance receiver is challenging due to various design considerations. For many applications, high receiver performance is required in order to meet system specifications and/or to achieve good performance. Receiver performance may be characterized by various parameters such as dynamic range, linearity, and noise performance. Dynamic range refers to the range of received signal level that the receiver is expected to handle. Linearity refers to the ability to amplify a signal without generating a large amount of distortion. Noise performance refers to the amount of noise generated by the receiver.

To achieve good performance while reducing power consumption, the receiver may be biased with different amounts of current depending on operating conditions. For example, more bias current may be used to improve linearity when large amplitude undesired signals (or jammers) are present, and less bias current may be used when jammers are not present. Changing bias current due to the presence or absence of jammers may disrupt the operation of various circuits within the receiver, which may in turn cause the receiver to operate improperly or possibly malfunction.

There is therefore a need in the art for techniques to control the operation of a receiver in order to ensure proper receiver operation when bias current and/or other characteristics of the receiver are changed.

SUMMARY

Techniques for controlling the operation of control loops in a receiver due to changes in operating state of the receiver are described herein. In an aspect, the operation of at least one control loop is modified in conjunction with a change in operating state. The change in operating state may correspond to a change in linearity state, gain state, operating frequency, antenna configuration, etc. The at least one control loop may comprise a direct current (DC) offset correction loop, an automatic gain control (AGC) loop, etc. The operation of a given control loop may be modified by (a) disabling the control loop or changing its time constant prior to changing operating state, (b) waiting a predetermined amount of time after changing operating state to allow the receiver to settle, and (c) enabling the control loop or restoring its time constant after waiting the predetermined amount of time.

In one specific design, the linearity state of the receiver may be changed, e.g., based on whether or not jammers are detected. A change in linearity state may result in adjustment of the bias current of at least one analog circuit block in the receiver. The operation of at least one control loop (e.g., the DC loop and AGC loop) may be modified in conjunction with the adjustment of the bias current, e.g., by disabling and enabling each control loop or by changing its time constant, as described above. For a given control loop, different values (e.g., for DC correction) may be associated with different amounts of bias current. A value associated with the new bias current may be recalled and applied to the control loop after the bias current adjustment.

Various aspects and features of the invention are described in further detail below.

DETAILED DESCRIPTION

Figure 1:
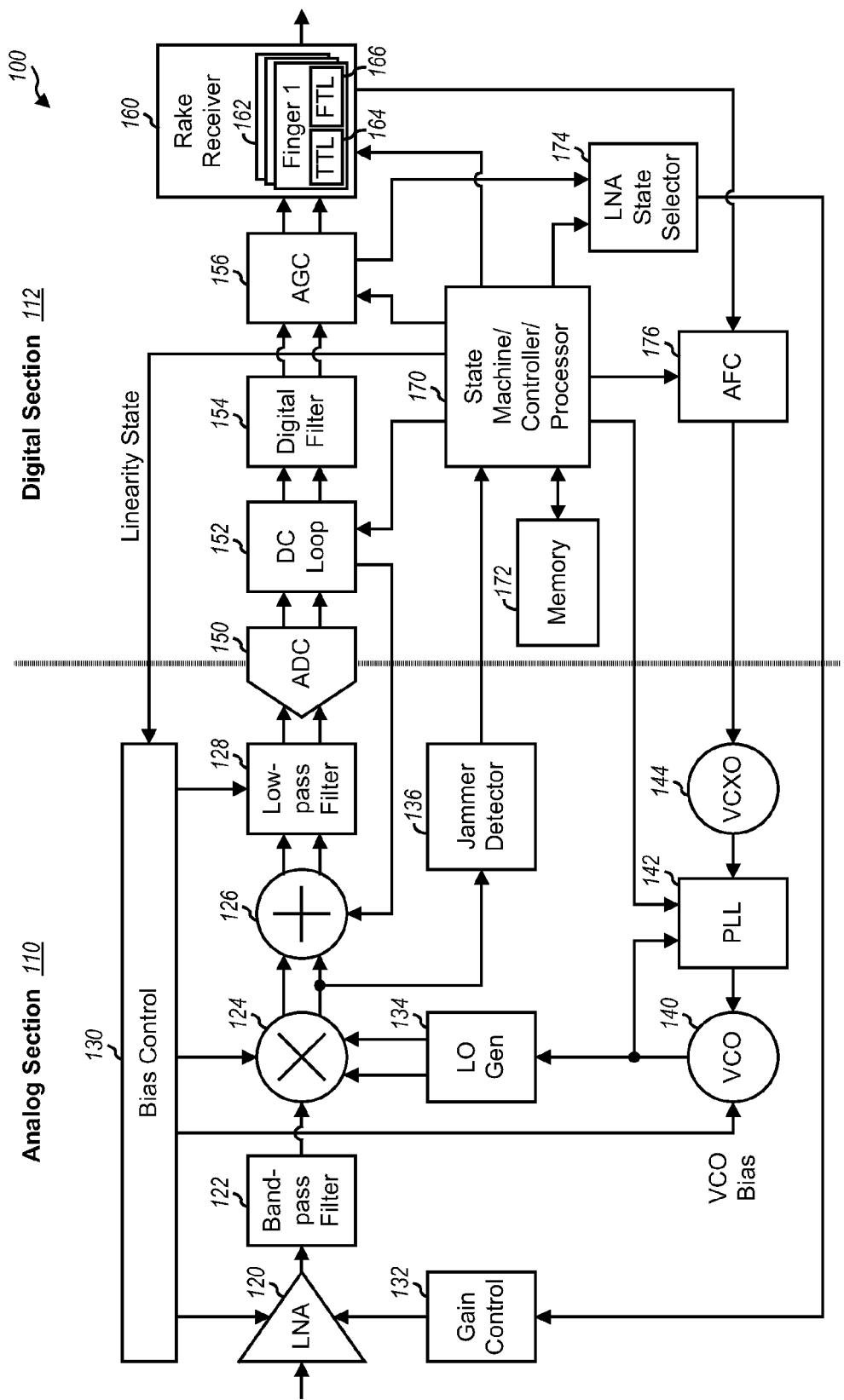
FIG. 1 shows a block diagram of a receiver for a wireless device.

FIG. 1 shows a block diagram of a receiver 100, which may be used for a wireless device. A wireless device may also be referred to as a mobile station, a user equipment, a user terminal, a subscriber unit, a handset, etc. A wireless device may be a cellular phone, a personal digital assistant (PDA), a wireless modem, a handheld device, etc. Receiver 100 includes an analog section 110 and a digital section 112.

Within analog section 110, a low noise amplifier (LNA) 120 amplifies a received RF signal with a selected gain and provides an amplified RF signal. LNA 120 may have multiple states, with each LNA state corresponding to a different discrete gain. One of the LNA states may be selected based on received signal level. A bandpass filter (BPF) 122 filters the amplified RF signal and provides a filtered RF signal. Bandpass filter 122 may pass signals in a frequency band of interest (e.g., cellular band or PCS band) and remove out-of-band noise and undesired signals. Bandpass filter 122 may be a surface acoustic wave (SAW) filter, a ceramic filter, or some other type of filter.

In general, a receiver may be implemented with a super-heterodyne architecture or a direct-to-baseband architecture. In the super-heterodyne architecture, the received RF signal is frequency downconverted in multiple stages, e.g., from RF to an intermediate frequency (IF) in one stage, and then from IF to baseband in another stage. In the direct-to-baseband architecture, the received RF signal is frequency downconverted from RF directly to baseband in one stage. The super-heterodyne and direct-to-baseband architectures may use different circuit blocks and/or have different requirements. For clarity, the following description is for the direct-to-baseband architecture.

A mixer 124 frequency downconverts the filtered RF signal with inphase (I) and quadrature (Q) local oscillator (LO) signals from an LO generator 134 and provides I and Q downconverted signals. An LO signal is a carrier signal at a desired frequency. The I and Q LO signals are 90° out of phase but have the same frequency. LO generator 134 generates the I and Q LO signals based on a VCO signal from a voltage controlled oscillator (VCO) 140. The frequency of the VCO signal is selected such that a desired signal in an RF channel of interest is downconverted to baseband or near baseband.

A summer 126 removes DC offset in the I and Q downconverted signals. A lowpass filter (LPF) 128 filters the I and Q baseband signals from summer 126 to pass the desired signal and to remove noise and undesired signals. One or more amplifiers, variable gain amplifiers (VGAs), and/or buffers (not shown in FIG. 1) may be placed anywhere in the receive path to provide amplification and buffering. An analog-to-digital converter (ADC) 150 digitizes the I and Q baseband signals and provides I and Q data samples.

Within digital section 112, a DC loop 152 determines the amount of DC in the data samples and provides a DC correction to summer 126. DC loop 152 may also remove residual DC error that is not removed by summer 126. Moreover, summer 126 may not be necessary and the whole of the dc correction loop contained in 152. A digital filter 154 filters the DC corrected samples and provides filtered samples. An AGC unit 156 scales the filtered samples and provides input samples having approximately constant power (a pre-determined number of levels of the ADC used, on an rms basis; for example, a 4-bit demodulator may implement an AGC where the output is 3 least significant bits (lsbs) rms). A rake receiver 160 includes a number of finger demodulators (or simply, fingers) 162. Each finger 162 may be assigned to process the input samples for one signal path of interest. Each finger 162 may include (a) a time tracking loop (TTL) 164 that tracks the timing of the signal path assigned to that finger and (b) a frequency tracking loop (FTL) 166 that tracks the frequency of the assigned signal path. Each finger 162 processes the input samples and provides demodulated symbols. Rake receiver 160 may combine the demodulated symbols from all assigned fingers and provide output symbols to a decoder (not shown in FIG. 1).

A jammer detector 136 detects for jammers based on the downconverted signal from mixer 124 and provides a jammer indicator. A jammer is an undesired signal that may be much larger in amplitude than a desired signal and may be located close in frequency to the desired signal. Jammer detector 136 may rectify and filter the downconverted signal, compare the resultant signal against a threshold, and generate the jammer indicator based on the comparison result. Jammer detector 136 may detect for close-in jammers and/or farther-out jammers, e.g., using filters with different bandwidths. Jammer detection may also be performed based on the data samples from ADC 150. For example, a Fourier transform may be performed on the data samples, and jammers may be detected by examining spectral components from the Fourier transform. Jammer detection may also be performed in other manners.

A state machine/controller/processor 170 may select a particular linearity state based on the jammer indicator from jammer detector 136. For example, state machine 170 may select a high linearity state when a close-in jammer is detected, a mid linearity state when a farther-out jammer is detected, or a low linearity state when no jammers are detected. In general, any number of linearity states may be defined for any set of operating conditions. The operating conditions may be quantified by jammers and/or other factors such as, e.g., received signal level. Each linearity state may be associated with specific settings for circuit blocks in receiver 100. The circuit settings may be for bias current, gain, and/or other characteristics.

A bias control unit 130 receives the selected linearity state from state machine 170 and generates bias controls for various circuit blocks such as LNA 120, mixer 124 and VCO 140, and filter 128, etc. For example, low bias current may be used for the low linearity state, more bias current may be used for the mid linearity state, and high bias current may be used for the high linearity state. Unit 130 may also generate a filter control that adjusts certain characteristics of lowpass filter 128. For example, a lower order and/or wider filter may be used for the low linearity state, and a higher order and/or narrower filter may be used for the high linearity state. Another embodiment of the filter is to design multiple branches that can be selected based on linearity state. By selecting fewer branches, essentially the same transfer function is obtained but the current is less. In this approach, current is reduced by selectively powering down branches of the filter.

A voltage controlled crystal oscillator (VCXO) 144 generates a reference signal having a precise frequency. VCXO 144 provides a reference frequency $f_{ref}$ for the receiver. A phase locked loop (PLL) 142 locks the frequency of VCO 140 to the frequency of VCXO 144. An AFC unit 176 receives frequency information from the FTLs within the assigned fingers and generates a frequency control that adjusts the frequency of VCXO 144. AFC unit 176 may remove long-term frequency error for all signal paths being processed. The FTL within each finger may remove short-term frequency error for the signal path assigned to that finger.

AGC unit 156 may determine the power (or amplitude) of the filtered samples and provide the measured power to an LNA state selector 174. Selector 174 may determine the received signal level based on the measured power from AGC unit 156 and the current LNA state. Selector 174 may select a suitable LNA state such that the measured power at AGC unit 156 is maintained within a predetermined range. Selector 174 may compare the received signal level against a set of switch points and may select an LNA state based on the comparison results. A gain control unit 132 receives the selected LNA state from selector 174 and generates a gain control for LNA 120.

FIG. 1 shows a specific design of receiver 100. In general, a receiver may perform signal conditioning using one or more stages of amplifier, filter, mixer, and so on, which may be arranged differently from the design shown in FIG. 1. A receiver may also employ other circuit blocks not shown in FIG. 1.

In the design shown in FIG. 1, receiver 100 includes the following control loops:
  DC loop—removes DC offset in the baseband signal,
  AGC loop—provides samples with proper power or rms level to rake receiver 160,
  Gain loop—selects a discrete gain step for LNA 120,
  AFC loop—adjusts the reference frequency of VCXO 144,
  PLL—locks the VCO frequency to the reference frequency,
  TTL—adjusts the timing of each finger, and
  FTL—adjusts the frequency of each finger.

The AGC loop and gain loop are inter-related. The AGC loop is implemented by AGC unit 156, and the gain loop is implemented by LNA state selector 174. The LNA state selection by selector 174 is dependent on the measured power from AGC unit 156. The selected LNA state in turn affects the signal level into AGC unit 156 and hence the measured power from AGC unit 156.

FIG. 1 shows a specific design of various control units. In general, a receiver may include any number of control loops, and each control loop may be for any parameter.

State machine 170 may control the operation of various control loops. For example, state machine 170 may disable and/or vary the time constant of one or more control loops prior to changing linearity state. State machine 170 may then enable and/or restore the time constant of the control loop(s) after the receiver settles. The control of the various loops is described below. State machine/controller/processor 170 may also direct the operations of other units within the receiver. A memory 172 stores data and program codes for state machine/controller/processor 170.

State machine 170 may change linearity state based on the presence or absence of jammers. The bias current of VCO 140 may be changed abruptly when switching linearity state. This abrupt change in bias current may disturb the frequency of VCO 140. PLL 142 may then track out the change in VCO frequency. However, the glitch or transient in VCO frequency may propagate through the receiver and disturb the operation of various control loops, as described below.

Figure 2:
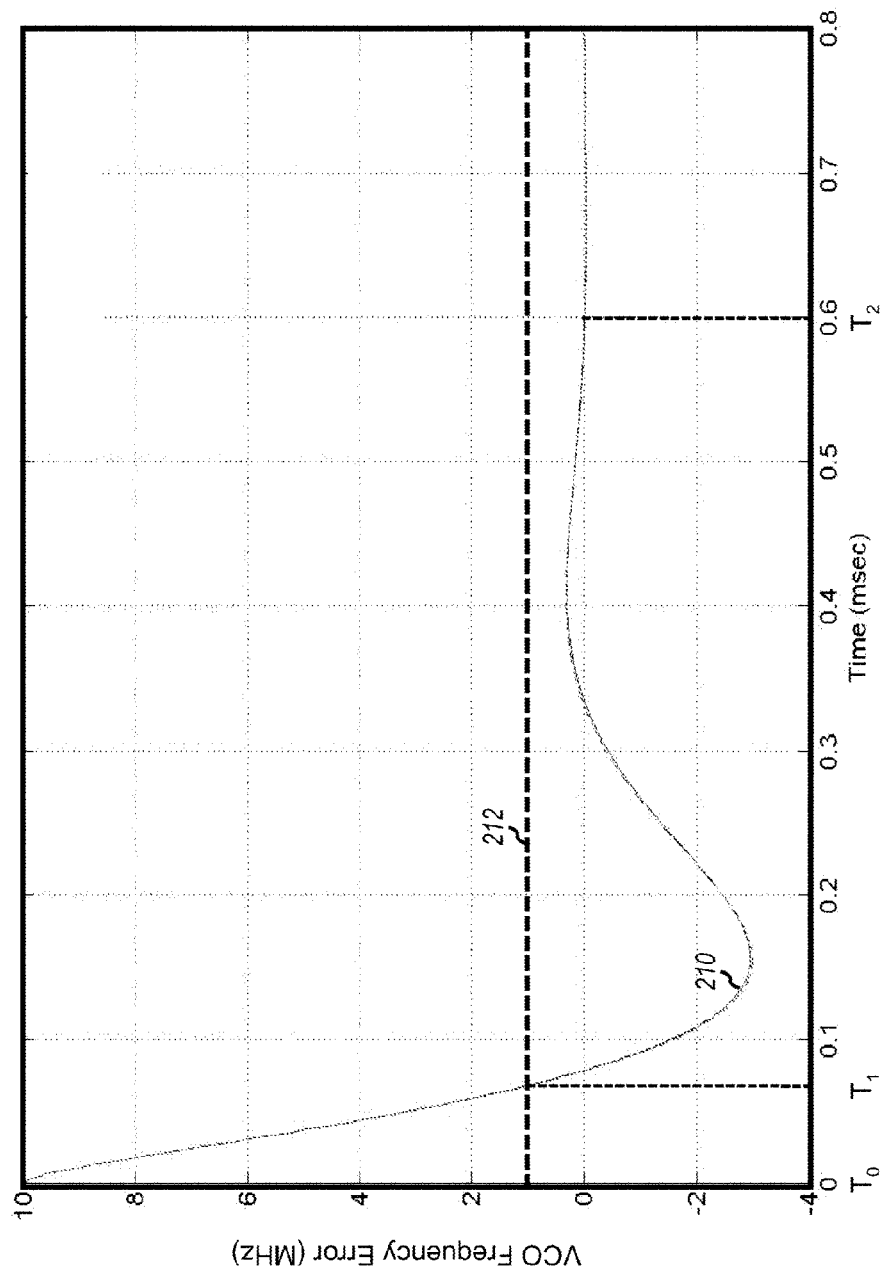
FIG. 2 shows VCO frequency error due to a change in bias current.

FIG. 2 shows a plot 210 of VCO frequency error versus time due to an abrupt change in VCO bias current. At time $T_0$, the VCO frequency changes by $f_{err}$ due to the abrupt change in VCO bias current. The peak VCO frequency error $f_{err}$ may be dependent on the VCO design, the amount and/or rate of change in bias current, and/or other factors. PLL 142 tracks out the VCO frequency error and has a step response that is determined by the design of the PLL. In the example shown in FIG. 2, the PLL response first undershoots and eventually settles to zero VCO frequency error.

The PLL may be controlled in various manners to mitigate the effects of transient in VCO frequency due to a change in linearity state. First, a shorter time constant may be used for the PLL when changing linearity state. The shorter time constant may allow the PLL to more quickly track out the VCO frequency error, which may then reduce impact due to the VCO transient. The PLL may be restored to operate in the nominal manner after the VCO frequency has settled to the final value, e.g., at time $T_2$ in FIG. 2. Second, the VCO bias current may be filtered to reduce the severity of the VCO transient. The PLL may also be operated in the nominal manner (i.e., without any modification) through a change in linearity state.

The AFC loop may also be controlled in various manners to mitigate the effects of the VCO transient. First, the AFC loop may be frozen (or maintained in the same state) prior to changing linearity state. Second, a longer time constant may be used for the AFC loop when changing linearity state. The longer time constant would slow down the rate at which the AFC loop can change and hence reduce the likelihood of erroneous updates. The AFC loop may be enabled or restored after the VCO frequency has settled. The AFC loop may also be operated in the nominal manner through a change in linearity state. The AFC loop bandwidth is typically much smaller than the PLL loop bandwidth and may be minimally affected by a change in linearity state.

Figure 3:
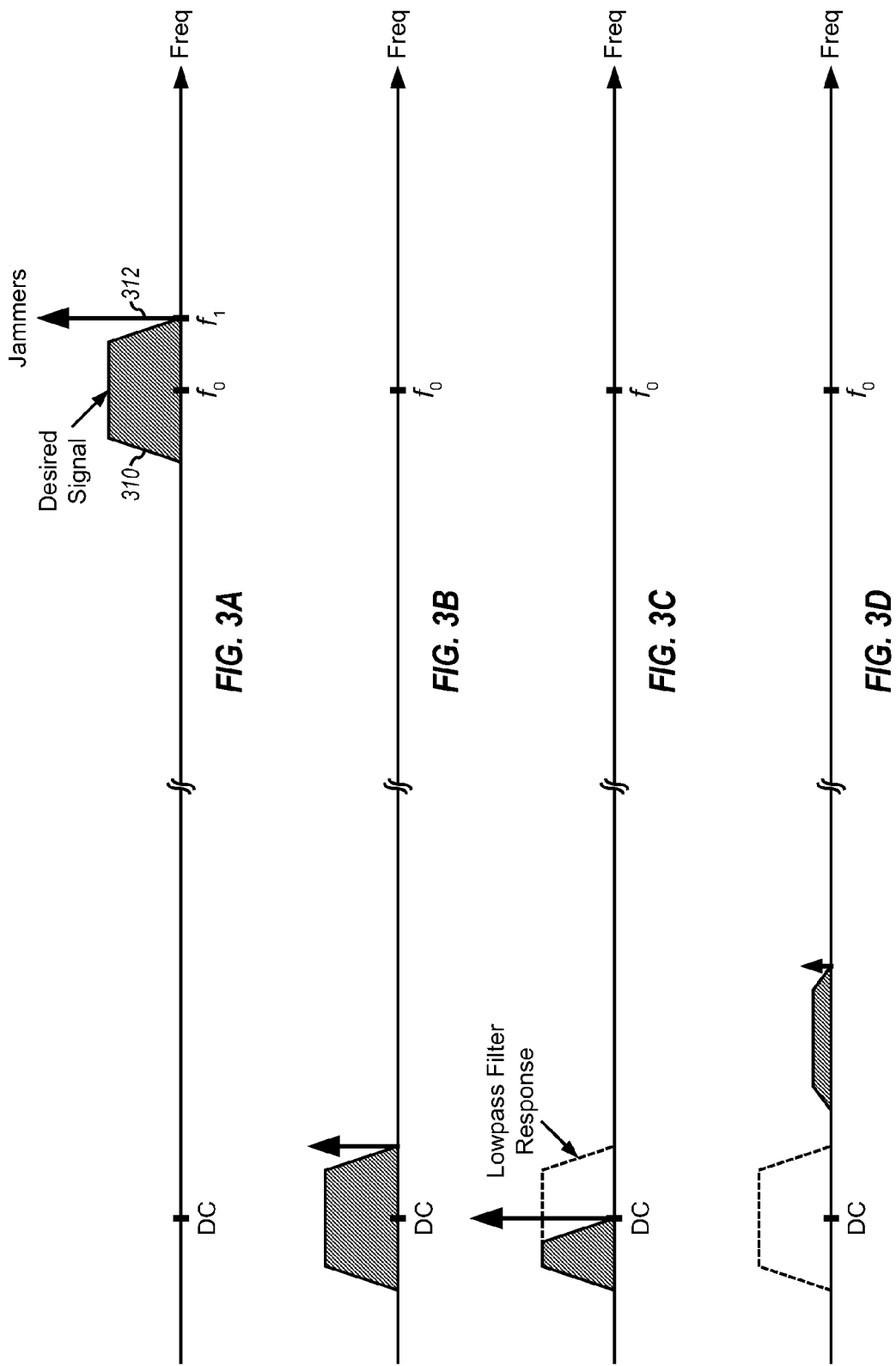
FIG. 3A shows a received radio frequency (RF) signal.
FIGS. 3B to 3D show baseband signals for different VCO frequency errors.

FIG. 3A shows a received RF signal at the input of LNA 120 in FIG. 1 for a single-tone test specified in IS-98D. The received RF signal includes a desired CDMA signal 310 centered at a frequency of $f_0$ and a single-tone jammer 312 located at a frequency of $f_1$. For cdma2000, the CDMA signal has a bandwidth of 1.23 MHz. For the single-tone test, the jammer is located at +900 KHz from the center frequency of the CDMA signal and is 72 decibels (dB) higher in amplitude than the CDMA signal level. This jammer models a strong interfering signal transmitted by a nearby base station in an Advanced Mobile Phone Service (AMPS) system. IS-98D also specifies a two-tone test in which two tones are located at +900 KHz and +1700 KHz from the center frequency of the CDMA signal and are 58 dB higher in amplitude than the CDMA signal level.

FIG. 3B shows a baseband signal at the input of ADC 150 in FIG. 1 for the single-tone test with zero VCO frequency error. In this case, the baseband signal includes the CDMA signal centered at DC and an attenuated jammer located at +900 KHz. Lowpass filter 128 has a bandwidth of approximately 620 KHz. With zero VCO frequency error, lowpass filter 128 passes the CDMA signal and attenuates the jammer. The jammer is further attenuated by digital filter 154 in FIG. 1.

FIG. 3C shows a baseband signal at the input of ADC 150 for the single-tone test with a VCO frequency error of +900 KHz. In this case, the VCO frequency is at the jammer frequency of $f_1$ and downconverts the jammer to DC. The baseband signal includes the jammer located at DC and a portion of the CDMA signal.

FIG. 3D shows a baseband signal at the input of ADC 150 for the single-tone test with a VCO frequency error of +2 MHz. In this case, the downconverted CDMA signal and jammer are both outside of the bandwidth of lowpass filter 128 and are attenuated. The baseband signal from lowpass filter 128 contains noise and possibly undesired signal component.

As shown in FIGS. 3B through 3D, when the VCO frequency is abruptly changed, the CDMA signal and jammer are first shifted in frequency by $f_{err}$ and are then swept across frequency as VCO 140 settles to the final value. Referring back to FIG. 2, if line 212 represents +900 KHz VCO frequency error, then the jammer is swept through DC at time $T_1$. The rapid sweep of the CDMA signal and jammer across frequency may disturb the operation of various control loops, as described below.

Figure 4:
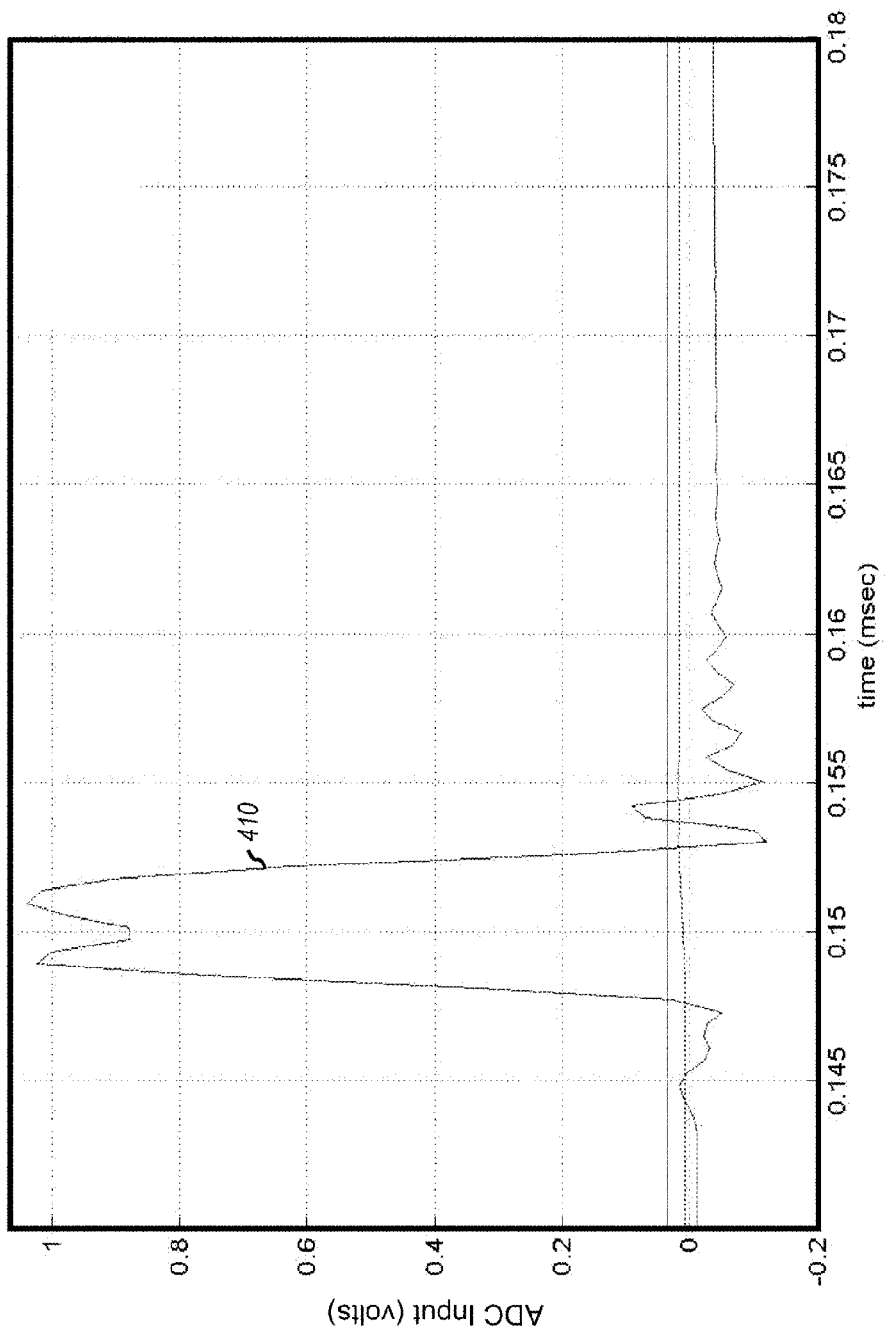
FIG. 4 shows a baseband signal when a jammer is swept through DC.

FIG. 4 shows a baseband signal at the input of ADC 150 when the jammer is swept through DC due to transient in VCO frequency. When the jammer is at DC, mixer 124, lowpass filter 128, and ADC 150 may saturate to their maximum values. The output of ADC 150 may be modeled as a pulse 410 of DC at or near the maximum value. The duration of this DC pulse is dependent on the rate at which the jammer is swept through DC.

DC loop 152 detects for DC error in the data samples from ADC 150. DC loop 152 may scale the data samples with a gain of $K_{DC}$ and may then accumulate the scaled samples with an accumulator. The gain $K_{DC}$ determines the time constant of the DC loop. A larger gain corresponds to a smaller time constant and a faster DC loop, and vice versa. The accumulator output is indicative of the DC error and may be compared against a threshold. DC loop 152 may update the DC correction when the accumulator output exceeds the threshold and may then send the updated DC correction to summer 126.

The DC pulse due to the jammer being swept across DC may adversely impact the DC loop in several ways. First, the DC pulse may cause erroneously updates of the DC correction, which may saturate lowpass filter 128 with DC. Second, the DC pulse may cause the DC loop accumulator to reach a large value or saturate. It may then take some time to recover from the large accumulator value, and performance may degrade until the accumulator is restored to the nominal value.

DC loop 152 may be controlled in various manners to avoid possible deleterious effects due to the jammer being swept across DC. First, DC loop 152 may be frozen prior to changing linearity state. This may be achieved, e.g., by setting the gain $K_{DC}$ to zero and/or by preventing update of the DC loop accumulator. Freezing the DC loop would prevent both erroneous updates of the DC correction and saturation of the DC loop accumulator. Second, a longer time constant may be used for the DC loop when changing linearity state. This may be achieved, e.g., by reducing the gain $K_{DC}$. The longer time constant would slow down the rate at which the DC loop accumulator can change and hence reduce the likelihood of erroneous updates of the DC correction. The DC loop may be enabled or restored after the VCO frequency settles to the final value.

Different linearity states may be associated with different DC offsets. The DC offset for each linearity state may be determined by DC loop 152 and stored in memory 172. Whenever a change in linearity state occurs, the DC offset corresponding to the new linearity state may be retrieved from memory 172, provided to DC loop 152, and used for the new linearity state. This may reduce DC offset after changing linearity state, which may improve performance.

AGC unit 156 measures the power of the filtered samples from digital filter 154 and provides the measured power to LNA state selector 174. AGC unit 156 may scale the filtered samples with a gain of $K_{AGC}$ and may then accumulate the scaled samples with an accumulator. The gain $K_{AGC}$ determines the time constant of the AGC loop. A larger gain corresponds to a smaller time constant and a faster AGC loop, and vice versa. The AGC accumulator output is indicative of the measured power. AGC unit 156 may include a digital variable gain amplifier (DVGA) that receives a scaling factor that is inversely related to the measured power, scales the filtered samples by the scaling factor, and provides input samples having approximately constant power.

Figure 5:
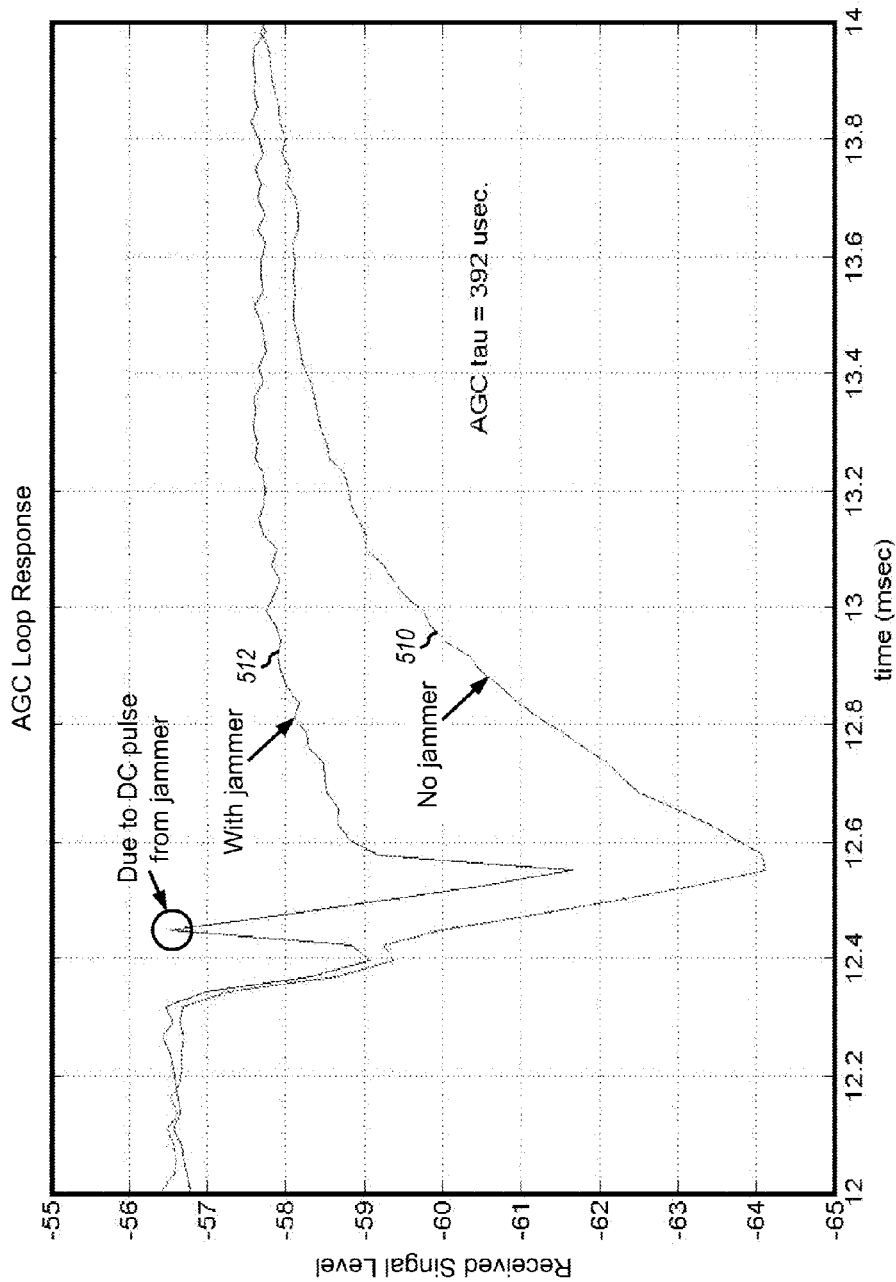
FIG. 5 shows received signal level due to transient in VCO frequency.

FIG. 5 shows received signal level due to transient in VCO frequency. A plot 510 shows received signal level versus time for the case in which jammers are not present, and a plot 512 shows received signal level versus time for the case in which a single-tone jammer is present. In plot 510, when the CDMA signal is swept across frequency due to the transient in VCO frequency, the CDMA signal may be outside of the bandwidth of filters 128 and 154 during parts of the VCO transient and would be attenuated by these filters. AGC loop 156 would detect a drop in signal level when the CDMA signal is outside of the filter bandwidth.

In plot 512, when the CDMA signal and jammer are swept across frequency, the CDMA signal may be outside of the filter bandwidth during parts of the VCO transient but the jammer may be inside of the filter bandwidth during other parts of the VCO transient. AGC loop 156 may detect a drop in signal level when the CDMA signal and jammer are both outside of the filter bandwidth and may detect a glitch when the jammer is within the filter bandwidth.

As shown in FIG. 5, the transient in VCO frequency may appear like a deep fade to the AGC loop. If the received signal level drops by a sufficient amount, then LNA state selector 174 may select another LNA state with higher gain to combat the deep fade.

Figure 6:
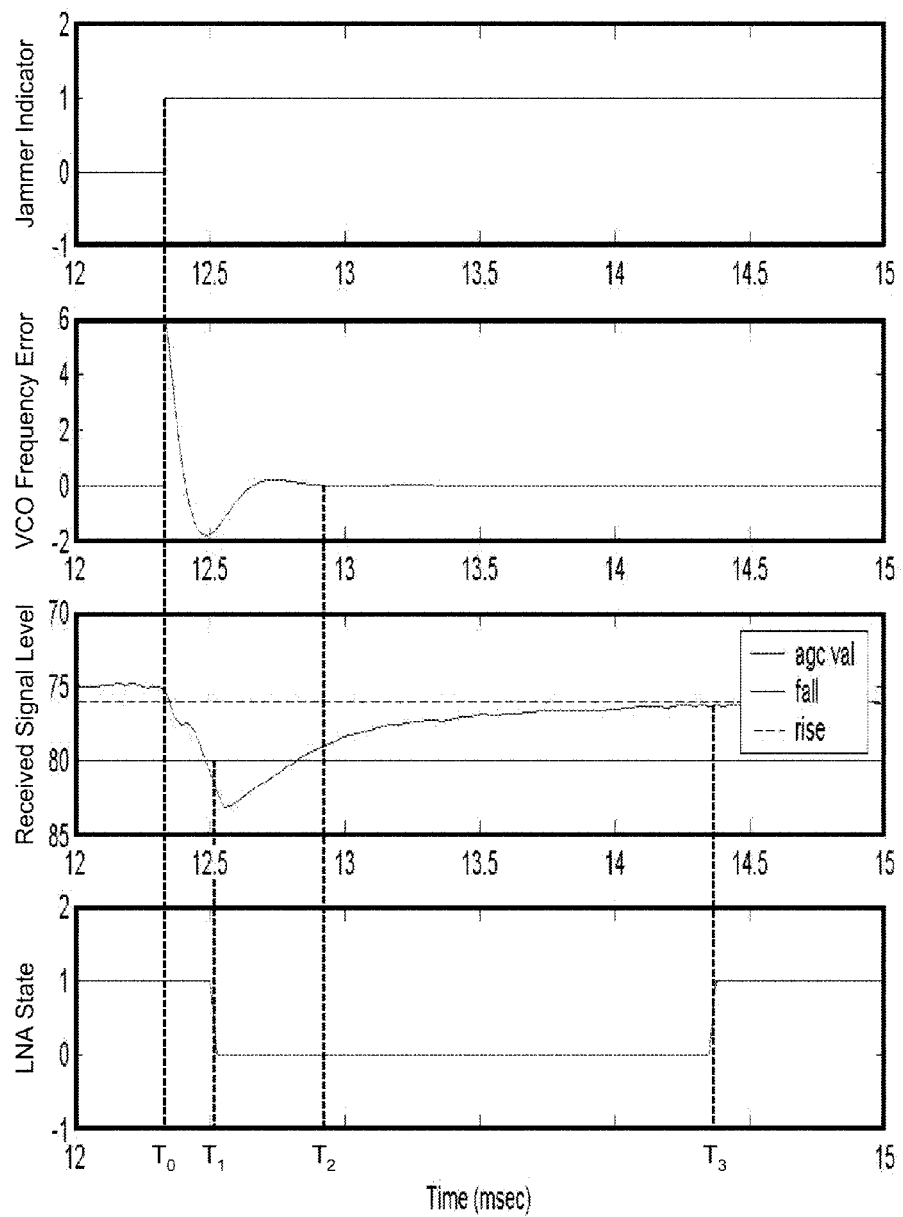
FIG. 6 shows changes in received signal level and LNA state due to transient in VCO frequency.

FIG. 6 shows plots of the jammer indicator, VCO frequency error, received signal level, and LNA state when a jammer is detected. At time $T_0$, jammer detector 136 detects a jammer and brings the jammer indicator to logic high. State machine 170 changes linearity state in response to the jammer indicator. The VCO frequency is abruptly shifted when the VCO bias current is changed due to a change in linearity state. The received signal level starts to drop when the CDMA signal is shifted outside of the filter bandwidth due to the VCO frequency error. At time $T_1$, the received signal level crosses a low threshold, and selector 174 selects another LNA state with higher gain. At time $T_2$, PLL 142 tracks out the VCO frequency error. In this example, the AGC loop is slower than the PLL, and the received signal level increases slowly. At time $T_3$, the received signal level crosses a high threshold, and selector 174 selects the old LNA state with lower gain.

As shown in FIG. 6, the AGC loop and gain loop for the receiver may be adversely impacted by the transient in VCO frequency in several ways. First, the AGC loop may be driven lower and may take some time to recover after the VCO frequency settles. Second, the low received signal level may cause a switch to an LNA state with higher gain. The receiver may be driven highly non-linear while LNA 120 operates in the higher gain state. The proper LNA state may be restored after the AGC loop recovers.

The AGC loop and gain loop may be controlled in several manners to avoid possible deleterious effects due to the transient in VCO frequency. First, the AGC loop may be frozen prior to changing linearity state. This may be achieved, e.g., by setting the AGC gain $K_{AGC}$ to zero and/or by preventing updates of the AGC accumulator. Freezing the AGC loop would prevent the AGC accumulator from being driven low during the VCO transient. Second, a longer time constant may be used for the AGC loop when changing linearity state. This may be achieved, e.g., by reducing the gain $K_{AGC}$. The longer time constant would slow down the rate at which the AGC accumulator can change. The gain loop may be frozen prior to changing linearity state to prevent selection of another LNA state due to a drop in received signal level. The AGC loop and gain loop may be enabled or restored after the VCO frequency settles.

Lowpass filter 128 may have different characteristics for different linearity states. For example, a lower order and/or wider filter may be used for the low linearity state, and a higher order and/or narrower filter may be used for the high linearity state. Different filter characteristics may be achieved with various designs. In one design, a bank of filters with different characteristics is implemented, and one of the filters is selected for use depending on the linearity state. In another design, multiple filter sections or branches are implemented, and different characteristics may be achieved by enabling different filter sections or branches.

Figure 7:
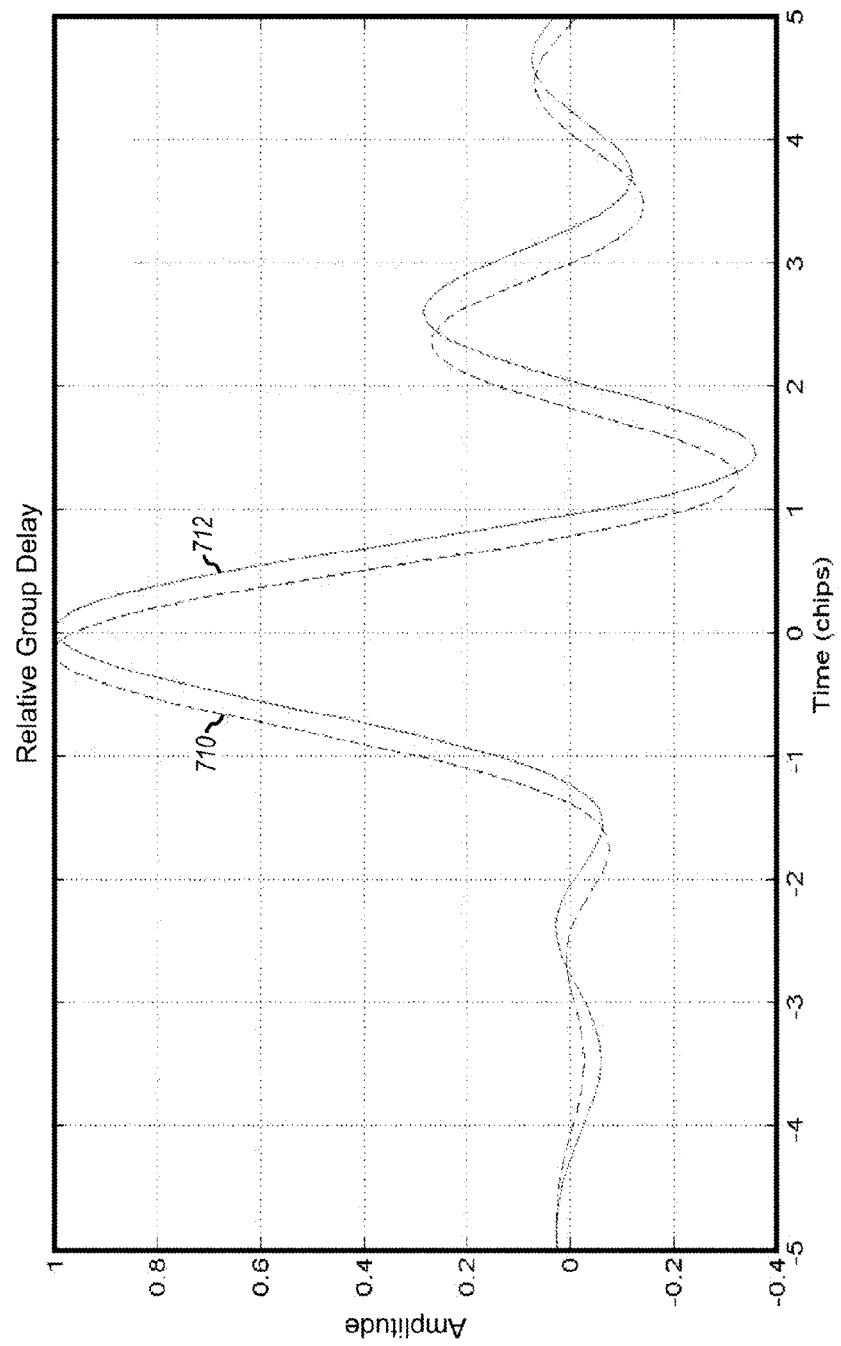
FIG. 7 shows group delay of a lowpass filter in different linearity states.

FIG. 7 shows a plot 710 of group delay for lowpass filter 128 in the low linearity state and a plot 712 of group delay for lowpass filter 128 in the high linearity state. The group delay determines the delay of a signal through the filter. The difference in the group delays for the two linearity states results in a sudden jump in the timing of the samples provided to rake receiver 160 whenever a change in linearity state occurs. The time tracking loop within each finger can track out this timing error. However, performance may degrade until the timing error is tracked out.

The time tracking loop may be controlled in several manners to account for a change in group delay. First, when a change in linearity state results in a change in group delay, the time tracking loop may be advanced or retarded by an amount corresponding to the difference in group delay. This reduces timing error due to a change in linearity state. Second, a shorter time constant may be used for the time tracking loop when changing linearity state. The shorter time constant would allow the time tracking loop to more quickly track out the timing error. The time tracking loop may be restored after some amount of time.

In general, a given control loop may be controlled in various manners such as:

Freeze the control loop and prevent update to the control loop,

Change the time constant of the control loop, e.g., use a longer time constant to reduce the update rate for the control loop or a shorter time constant to increase the update rate, and Compensate the control loop to account for known variation.

A control loop (e.g., the DC loop, AGC loop, or AFC loop) may be frozen if it is desirable to avoid disturbance to the control loop due to a transient caused by a change in linearity state. A control loop (e.g., the DC loop, AGC loop, or AFC loop) may have its time constant increased to reduce the effects due to the transient. A control loop (e.g., the PLL or TTL) may have its time constant reduced to more quickly combat the transient. A control loop (e.g., the DC loop or TTL) may be compensated if a value to be used after a change in linearity state is known. Only a subset of the actions described above may be applicable for a given control loop.

In general, the operation of any control loop or any combination of control loops may be modified to mitigate the effects of a linearity state change. The particular control loop(s) to modify may be dependent on various factors such as, e.g., the receiver design, the loop design, the operating conditions, etc.

In one specific design, the operation of the DC loop, AGC loop, and gain loop is modified in a deterministic manner when a change in linearity state occurs. The following sequence may be performed for a change in linearity state:

1. Disable the DC loop, e.g., freeze the DC loop accumulator,
2. Save the DC correction provided to summer 126,
3. Disable the AGC loop, e.g., freeze the AGC accumulator,
4. Disable the gain loop to prevent LNA state change,
5. Change to a new linearity state.
6. Wait for the PLL to settle,
7. Retrieve and use the DC correction for the new linearity state,
8. Enable the DC loop, e.g., clear and enable the DC loop accumulator,
9. Enable the AGC loop, e.g., enable the AGC accumulator, and
10. Enable the gain loop to allow LNA state change.

The operation of the DC, AGC, and gain loops may also be modified in other manners. Other sequences may also be defined for modifying the operation of other combinations of control loops.

Figure 8:
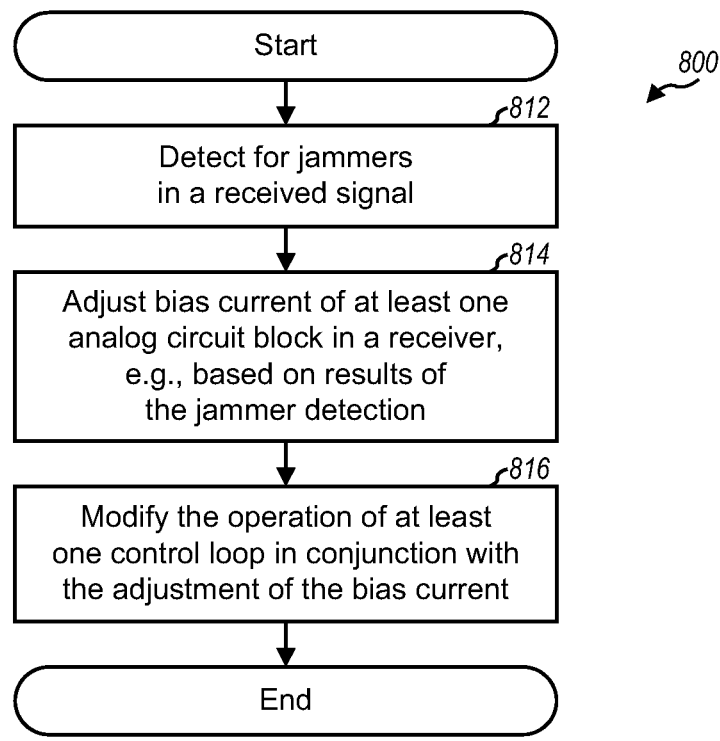
FIG. 8 shows a process to modify loop operation for bias current adjustment.

FIG. 8 shows a process 800 for controlling the operation of control loops. Process 800 may be performed by a wireless device. Jammers in a received signal are detected, e.g., with an analog and/or digital jammer detector (block 812). Bias current of at least one analog circuit block in a receiver is adjusted, e.g., based on the results of the jammer detection (block 814). For example, the bias current may be increased when jammers are detected or decreased when jammers are not detected. The bias current may also be adjusted by different amounts depending on the jammer strength. The analog circuit block(s) having their bias current adjusted may include a VCO, an LNA, a mixer, etc.

The operation of at least one control loop is modified in conjunction with the adjustment of the bias current (block 816). The control loop(s) may comprise a DC loop, an AGC loop, etc. Block 816 may be achieved in various manners. For example, a given control loop may be disabled (or frozen) prior to the bias current adjustment and enabled after the bias current adjustment. The time constant of the control loop may also be increased or decreased prior to the bias current adjustment and restored after the bias current adjustment. A predetermined amount of time may be waited prior to enabling the control loop or restoring its time constant. Different control loops may also be modified in different manners, e.g., one control loop may be disabled while another control loop may have its time constant varied.

For a given control loop, a value associated with the new bias current (e.g., for DC correction) may be determined and applied to the control loop after the bias current adjustment. Discrete gain adjustment for the receiver may be disabled prior to the bias current adjustment and enabled after the bias current adjustment. A filter may also be adjusted (e.g., to a different order, bandwidth, etc.) along with the bias current adjustment. A time tracking loop may be modified in conjunction with the filter adjustment.

For clarity, the techniques for controlling the operation of control loops have been specifically described for a change in linearity state. The techniques may also be used for other types of changes in operating state. For example, the techniques may be used to modify the operation of control loops due to a change in gain state, a change in operating frequency, a change in antenna configuration, etc. Each of these changes may disturb the operation of circuit blocks within the receiver. For control loops that may be affected by a change in operating state, the operation of these control loops may be modified to combat possible deleterious effects due to the change in operating state.

Figure 9:
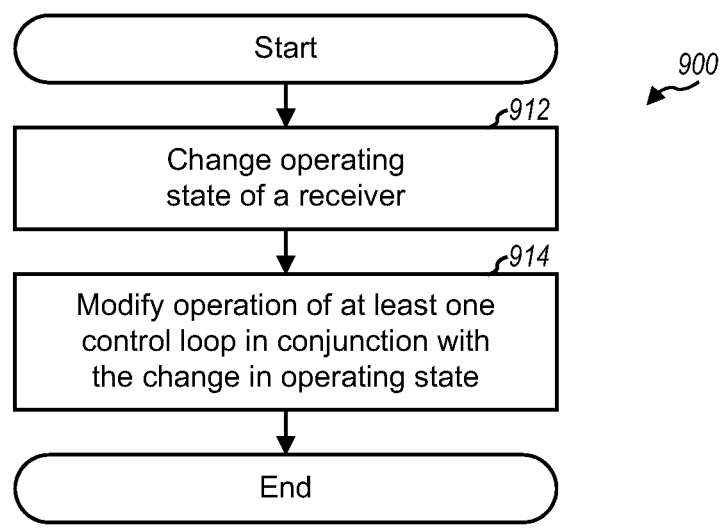
FIG. 9 shows a process to modify loop operation for a change in operating state.

FIG. 9 shows a process 900 for controlling the operation of control loops. Process 900 may also be performed by a wireless device. The operating state of a receiver is changed (block 912). The change in operating state may correspond to a change in linearity state, gain state, operating frequency, antenna configuration, etc. The operation of at least one control loop is modified in conjunction with the change in operating state (block 914). The at least one control loop may comprise a DC loop, an AGC loop, a PLL, an AFC loop, a TTL, a FTL, or any combination thereof. A given control loop may be modified by (a) disabling the control loop prior to changing operating state, (b) waiting a predetermined amount of time after changing operating state, and (c) enabling the control loop after waiting the predetermined amount of time. A control loop may also be modified in other manners, as described above.

The techniques described herein may be implemented by various means. For example, these techniques may be implemented in hardware, firmware, software, or a combination thereof. For a hardware implementation, the unit or units used to control the operation of various control loops may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 172 in FIG. 1) and executed by a processor (e.g., processor 170). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples shown herein but is to be accorded the widest scope consistent with the principles and novel features disclosed herein.

What is claimed is:

1. An apparatus, configured to:
   adjust a bias current of at least one analog circuit block in a receiver; and
   modify operation by preventing an update of at least one control loop separate from both the at least one analog circuit block and control of the bias current during the adjustment of the bias current.

2. The apparatus of claim 1, wherein the at least one analog circuit block comprises a voltage controlled oscillator (VCO).

3. The apparatus of claim 1, and configured
   to detect for jammers in a received signal, and
   to adjust the bias current based on results of the detection for jammers.

4. The apparatus of claim 1, and configured to increase the bias current when jammers are detected and to decrease the bias current when jammers are not detected.

5. The apparatus of claim 1, and configured
   to disable a control loop prior to the adjustment of the bias current, and
   to enable the control loop after the adjustment of the bias current.

6. The apparatus of claim 5, and configured
   to wait a predetermined amount of time after the adjustment of the bias current, and
   to enable the control loop after waiting the predetermined amount of time.

7. The apparatus of claim 5, and configured to filter or accumulate, or integrate the jammer detector output before the adjustment of the bias current and to disable the control loop before the adjustment of the bias current.

8. The apparatus of claim 1, and configured
   to increase a time constant of a control loop prior to the adjustment of the bias current, and
   to restore the time constant of the control loop after the adjustment of the bias current.

9. The apparatus of claim 1, wherein the at least one control loop comprises a
   direct current (DC) loop, and wherein the apparatus is configured
   to disable the DC loop or increase a time constant of the DC loop prior to the adjustment of the bias current, and
   to enable the DC loop or restore the time constant of the DC loop after the adjustment of the bias current.

10. The apparatus of claim 1, wherein the at least one control loop comprises an
    automatic gain control (AGC) loop, and wherein the apparatus is configured
    to disable the AGC loop or increase a time constant of the AGC loop prior to the adjustment of the bias current, and
    to enable the AGC loop or restore the time constant of the AGC loop after the adjustment of the bias current.

11. The apparatus of claim 1, and configured
    to determine, for a control loop, a value associated with the adjusted bias current, and
    to apply the value to the control loop after the adjustment of the bias current.

12. The apparatus of claim 11, wherein the control loop is a direct current (DC) loop or a time tracking loop, and wherein the value is for a DC correction or delay.

13. The apparatus of claim 1, and configured
    to disable discrete gain adjustment prior to the adjustment of the bias current, and
    to enable discrete gain adjustment after the adjustment of the bias current.

14. The apparatus of claim 1, and configured
    to adjust a filter along with the adjustment of the bias current, and
    to modify a time tracking loop in conjunction with the adjustment of the filter.

15. The apparatus of claim 1, and configured to turn off branches of a filter to reduce current consumption without substantially effecting the impulse response or transfer function of the filter.

16. A method comprising:
    adjusting a bias current of at least one analog circuit block in a receiver; and
    modifying operation by preventing an update of at least one control loop separate from both the at least one analog circuit block and control of the bias current during the adjustment of the bias current.

17. The method of claim 16, wherein the adjusting the bias current comprises
    increasing the bias current when jammers are detected, and
    decreasing the bias current when jammers are not detected.

18. The method of claim 16, wherein the modifying the operation of the at least one control loop comprises
    disabling a control loop prior to the adjustment of the bias current, and
    enabling the control loop after the adjustment of the bias current.

19. An apparatus comprising:
    means for adjusting a bias current of at least one analog circuit block in a receiver; and
    means for modifying operation by preventing an update of at least one control loop separate from both the at least one analog circuit block and control of the bias current during the adjustment of the bias current.

20. The apparatus of claim 19, wherein the means for adjusting the bias current comprises
    means for increasing the bias current when jammers are detected, and
    means for decreasing the bias current when jammers are not detected.

21. The apparatus of claim 19, wherein the means for modifying the operation of the at least one control loop comprises
    means for disabling a control loop prior to the adjustment of the bias current, and
    means for enabling the control loop after the adjustment of the bias current.

22. An apparatus, configured to:
    change an operating state of a receiver; and
    modify operation by preventing an update of at least one control loop separate from both the at least one analog circuit block and control of the bias current during the change in the operating state.

23. The apparatus of claim 22, wherein the change in operating state corresponds to a change in linearity state of the receiver.

24. The apparatus of claim 22, wherein the change in operating state corresponds to a change in gain state of the receiver.

25. The apparatus of claim 22, wherein the change in operating state corresponds to a change in antenna configuration.

26. The apparatus of claim 22, wherein the at least one control loop comprises at least one of a direct current (DC) loop, an automatic gain control (AGC) loop, a phase locked loop (PLL), an automatic frequency control (AFC) loop, a time tracking loop (TTL), and a frequency tracking loop (FTL).

27. The apparatus of claim 22, and configured
   to disable a control loop prior to changing operating state,
   to wait a predetermined amount of time after changing operating state, and
   to enable the control loop after waiting the predetermined amount of time.

28. A wireless device, configured to:
   detect for jammers in a received signal;
   change linearity state of a receiver based on results of the detection for jammers;
   disable a direct current (DC) loop prior to changing linearity state;
   disable an automatic gain control (AGC) loop prior to changing linearity state;
   enable the DC loop after changing linearity state; and
   enable the AGC loop after changing linearity state.

* * * * *